(12) United States Patent
Dube et al.

(10) Patent No.: US 9,715,408 B2
(45) Date of Patent: *Jul. 25, 2017

(54) DATA-AWARE WORKLOAD SCHEDULING AND EXECUTION IN HETEROGENEOUS ENVIRONMENTS

(71) Applicant: International Business Machines Corporation, Armonk, NY (US)

(72) Inventors: Parijat Dube, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,269

(22) Filed: Oct. 13, 2016

(65) Prior Publication Data

US 2017/0031712 A1 Feb. 2, 2017

Related U.S. Application Data

(63) Continuation of application No. 14/489,664, filed on Sep. 18, 2014, now Pat. No. 9,513,967.

(51) Int. Cl.
G06F 9/54 (2006.01)
G06F 9/48 (2006.01)
G06F 9/50 (2006.01)

(52) U.S. Cl.
CPC .......... *G06F 9/4881* (2013.01); *G06F 9/5005* (2013.01); *G06F 9/5011* (2013.01); *G06F 9/5027* (2013.01)

(58) Field of Classification Search
None
See application file for complete search history.

(56) References Cited

U.S. PATENT DOCUMENTS 8,375,392 B2 2/2013 Becchi et al.
9,135,581 B1 9/2015 Beckford
(Continued)

OTHER PUBLICATIONS

Augonnet, et al., "Data-Aware Task Scheduling on Multi-Accelerator based Platforms", 2010 16th International Conference on Parallel and Distributed Systems, IEEE Computer Society, pp. 291-298, © 2010 IEEE.

(Continued)

*Primary Examiner* — Syed Roni
(74) *Attorney, Agent, or Firm* — Edward J. Wixted, III

(57) ABSTRACT

In an approach for scheduling the execution of a workload in a computing environment, a computer receives a request for scheduling execution of a computing job, wherein the computing job includes a plurality of computing tasks to be executed in a sequence, and wherein at least one computing task requires access to a set of data. The computer identifies information related to the computing environment, wherein the information comprises at least processors available to execute each computing task of the plurality of computing tasks and storage device proximity to the processors. The computer determines an execution configuration for the computing job based, at least in part, on the received request, the information related to the computing environment, and current utilization of the processors' resources. The computer schedules execution of the execution configuration for the computing job.

12 Claims, 6 Drawing Sheets

(56) References Cited

U.S. PATENT DOCUMENTS

2013/0232495 A1 9/2013 Rossbach et al.
2016/0085587 A1 3/2016 Dube et al.

OTHER PUBLICATIONS

Augonnet, et al., "StarPU-MPI: Task Programming over Clusters of Machines Enhanced with Accelerators", The 19th European MPI Users' Group Meeting (EuroMPI 2012) 7490 (2012), hal-00725477, version 1, Aug. 27, 2012.
Currey, et al., "Scheduling Dataflow Execution Across Multiple Accelerators", © 2014, 6 Pages.
Yin, Dengpan, "Data-Aware Workflow Scheduling in Heterogeneous Distributed Systems", A Dissertation, Dec. 2011, 102 Pages.
Appendix P: List of IBM Patents or Patent Applications Treated as Related, Dated Oct. 13, 2016, pp. 1-2.

DATA-AWARE WORKLOAD SCHEDULING AND EXECUTION IN HETEROGENEOUS ENVIRONMENTS

BACKGROUND OF THE INVENTION

The present invention relates generally to the field of program execution management and more particularly to workload scheduling in a heterogeneous environment.

Many modern computers utilize specialized components such as graphical programming units (GPUs) or field-programmable gate arrays (FPGAs) in addition to central processing units (CPUs) in order to perform a specific type of computation more quickly or efficiently. Various data storage devices such as hard disk drives (HDDs), solid state drives (SSDs), or flash storage can also be utilized to improve a data transfer rate or latency.

SUMMARY

Embodiments of the present invention disclose a method, computer program product, and computing system for scheduling the execution of a workload on a heterogeneous computing device. A computer receives a request for scheduling execution of a computing job, wherein the computing job includes a plurality of computing tasks to be executed in a sequence, and wherein at least one computing task requires access to a set of data. The computer identifies information related to the computing environment, wherein the information comprises at least processors available to execute each computing task of the plurality of computing tasks and storage device proximity to the processors. The computer determines an execution configuration for the computing job based, at least in part, on the received request, the information related to the computing environment, and current utilization of the processors' resources. The computer schedules execution of the execution configuration for the computing job.

DETAILED DESCRIPTION

Embodiments of the present invention recognize that as computers incorporate a wider variety of specialized components, scheduling the execution of tasks to incorporate the benefits of these specialized components becomes more difficult. Embodiments of the present invention disclose an approach for scheduling the execution of tasks on a computing device, herein referred to as a heterogeneous computing device, with a variety of different specialized components.

The present invention will now be described in detail with reference to the Figures.

Figure 1:
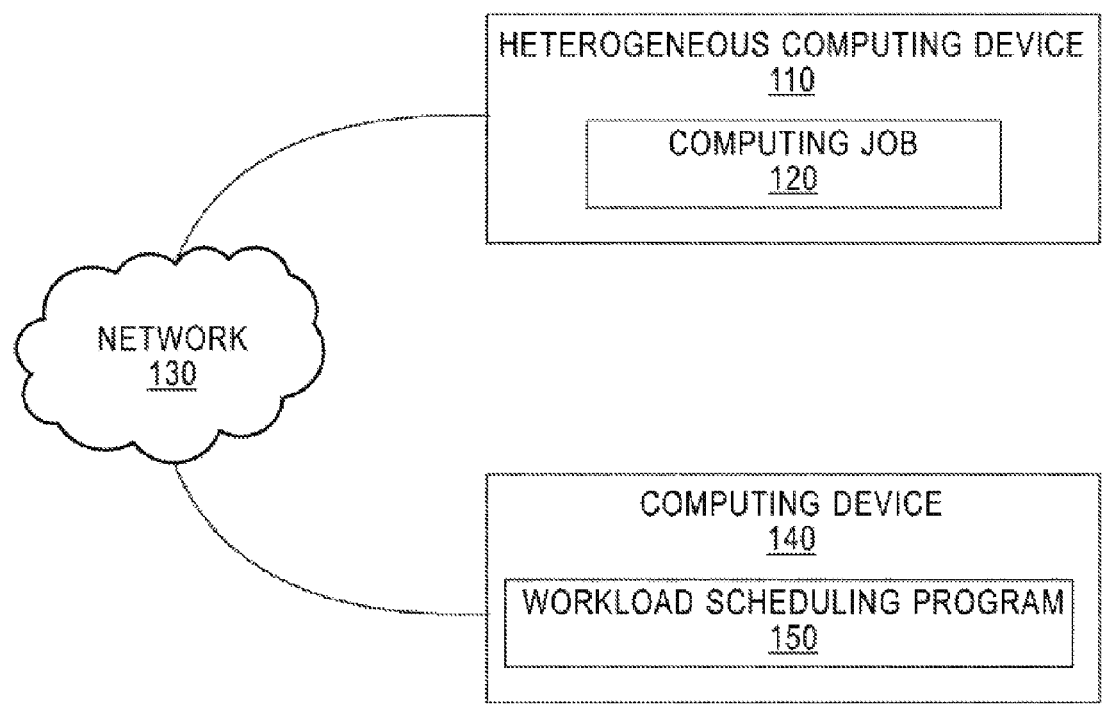
FIG. 1 is a functional block diagram illustrating a computing environment, in accordance with an embodiment of the present invention.

FIG. 1 is a functional block diagram illustrating a computing environment, generally designated 100, in accordance with one embodiment of the present invention. Computing environment 100 includes heterogeneous computing device 110 and computing device 140 connected over network 130. Heterogeneous computing device 110 contains computing job 120, and computing device 140 contains workload scheduling program 150.

In the depicted embodiment, workload scheduling program 150 is stored on computing device 140. However, in other embodiments, workload scheduling program 150 can be stored on heterogeneous computing device 110 along with computing job 120.

In one embodiment, computing job 120 and workload scheduling program 150 are stored on heterogeneous computing device 110 and computing device 140. However, in other embodiments, computing job 120 and workload scheduling program 150 are stored externally and accessed through a communication network such as network 130. Network 130 can be, for example, a local area network (LAN), a wide area network (WAN) such as the internet, or a combination of the two, and may include wired, wireless, fiber optic or any other connection known in the art. In general, network 130 can be any combination of connections and protocols that will support communications between heterogeneous computing device 110, computing device 140, computing job 120, and workload scheduling program 150, in accordance with an embodiment of the present invention.

In various embodiments of the present invention, computing device 140 can be a server, laptop computer, tablet computer, netbook computer, personal computer (PC), or desktop computer. In another embodiment, computing device 140 represents a computing system utilizing clustered computers and components to act as a single pool of seamless resources. In general, computing device 140 can be any computing device or a combination of devices with access to workload scheduling program 150 and network 130 and is capable of processing program instructions and executing workload scheduling program 150, in accordance with an embodiment of the present invention. Computing device 140 may include internal and external hardware components, as depicted and described in further detail with respect to FIG. 7.

In various embodiments of the present invention, heterogeneous computing device 110 is a computing device including two or more data processing or data storage elements such as central processing units (CPUs), graphics processing units (GPUs), field-programmable gate arrays (FPGAs), hard disk drives (HDDs), solid state drives (SSDs), flash storage, or any other data processing or data storage element capable of performing computation, executing computer-readable program instructions, or storing computer-readable information. In the depicted embodiment as described in greater detail with respect to FIG. 4, heterogeneous computing device 110 includes three CPUs (i.e., CPUs 401, 402, 404), one GPU (i.e., GPU 403), one FPGA (i.e., FPGA 405), one HDD (i.e., HDD 412), and two SSDs (i.e., SSDs 411, 413). However, in other embodiments, heterogeneous computing device 110 can include any number of each type of data processing or data storage element, as well as additional data processing or data storage elements not included in the depicted embodiment (see FIG. 4). In another embodiment, heterogeneous computing device 110 represents a computing system utilizing clustered computers and components to act as a single pool of seamless resources. In other embodiments, heterogeneous computing device 110 may represent a server computing system utilizing multiple computers as a server system, such as in a cloud computing environment.

In various embodiments, computing job 120 includes a set of tasks which are to be performed by heterogeneous computing device 110. Computing job 120 includes a list of tasks which are to be performed as part of computing job 120, as well as any dependencies for a task contained within computing job 120. A dependency for a task can include, for example, a need to complete a first task before starting the execution of a second task, or identification of a portion of data required to execute a task, as described in greater detail with respect to FIG. 3.

In general, workload scheduling program 150 is a program that handles scheduling the execution of tasks within a computing job such as computing job 120. In one embodiment, scheduling the execution of a task comprises selecting which data processing element is to perform each of the tasks included in computing job 120 as well as which storage device is to provide each portion of data. Workload scheduling program 150 evaluates feasible mappings for executing a computing job, taking into consideration a comparison of the different levels of performance from each type of compute node and/or data storage node. For example, in embodiments where computing job 120 includes a task which includes heavy graphical computation, workload scheduling program 150 may select an execution mapping which utilizes a GPUs ability to perform graphical computations more efficiently and quickly than a CPU to allow the task to be executed more quickly than it would be executed on a CPU. Additionally, workload scheduling program 150 may account for the location of data needed to perform a task, in embodiments where computing nodes that have local access to required data are preferred. For example, if a database query task is to be performed by one of two CPUs, and a copy of the database to be queried is directly connected to a first CPU and indirectly connected to a second CPU, such as an embodiment where data must pass from the database through the first CPU to reach the second CPU, then workload scheduling program 150 may schedule the database query task to be executed by the first CPU that is directly connected to the database in order to potentially decrease execution time of the database query task. Additionally, workload scheduling program 150 may account for differences in performance between different types of data storage nodes present within heterogeneous computing device 110, such as HDDs, SSDs, flash storage, or any other device capable of storing computer-readable information. In one embodiment, differences in storage device performance are determined by comparing the known maximum data read and write speeds which the data storage node can perform, while in other embodiments a separate program monitors the read and write speeds of a storage device to determine an average speed for each storage device. Differences in seek time or data I/O speed between these different types of data storage nodes can be utilized in order to improve the overall job execution time or efficiency of a computing job executing on heterogeneous computing device 110.

Figure 2:
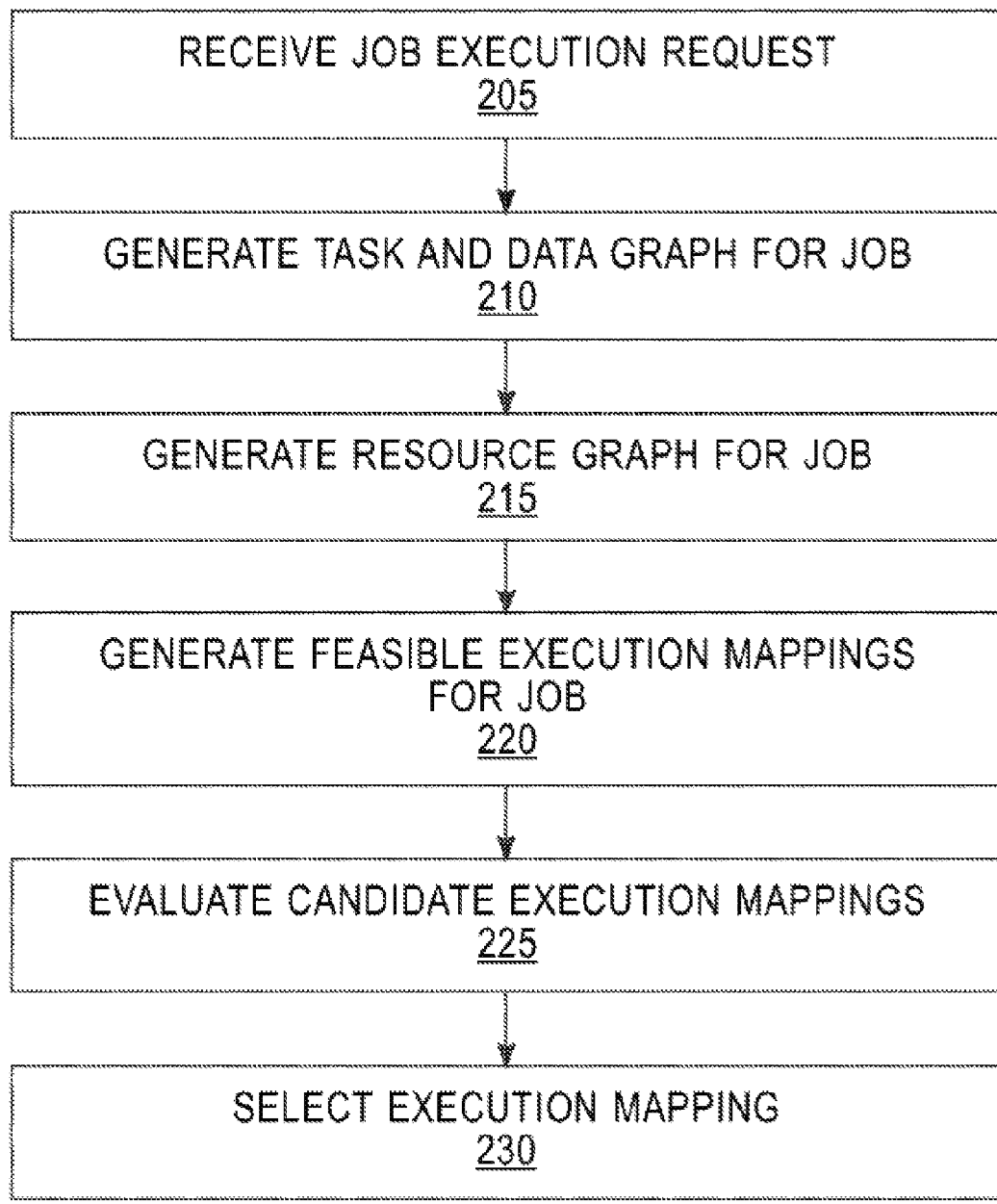
FIG. 2 is a flowchart depicting operational steps of a workload scheduling program, on a computing device within the computing environment of FIG. 1, for scheduling the execution of a computing job on a heterogeneous computing device, in accordance with an embodiment of the present invention.

FIG. 2 is a flowchart, 200, depicting operational steps of workload scheduling program 150, executing on computing device 140 within the computing environment 100 of FIG. 1, in accordance with an embodiment of the present invention. More specifically, flowchart 200 depicts operational steps of workload scheduling program 150 for scheduling the execution of computing jobs, such as computing job 120, on a heterogeneous computing device, such as heterogeneous computing device 110, in accordance with an embodiment of the present invention.

In step 205, workload scheduling program 150 receives a request for execution of a computing job. In the depicted embodiment, workload scheduling program 150 receives a request for execution of computing job 120. A request for execution of a computing job received in step 205 includes at least a list of tasks to be executed as part of the computing job, as well as any dependencies required for execution of those tasks. In some cases, a dependency for a task includes a prerequisite task which must be completed before the execution of that task can begin. For example, if task B requires task A to be completed before it can be executed, then task B will have task A listed as a prerequisite dependency. Additionally, a dependency for a task can also include a data dependency which prevents the execution of a task unless a specific portion of data is available. For example, if task B requires data set C in order to be executed, then task B will have data set C listed as a data dependency. While this example only describes a task with a single prerequisite task and data dependency, in other embodiments, tasks within computing jobs such as computing job 120 may contain various numbers of prerequisite tasks or data dependencies, or may contain no prerequisite tasks or data dependencies. In the depicted embodiment (see FIG. 3), computing job 120 contains tasks 301, 302, 303, and 304. In the depicted embodiment, task 301 has no prerequisite tasks, and has a dependency of data set 311 in order to be executed. Task 302 has task 301 as a prerequisite task, and has no data dependencies. Task 303 has task 301 as a prerequisite task, and has data dependencies of data set 311 and data set 312 in order to execute. Task 304 has both task 302 and task 303 as prerequisite tasks, and has a dependency of data set 312 in order to execute. The prerequisite tasks and data dependencies for each task included in the depicted embodiment are visually represented and described in greater detail with respect of FIG. 3.

In step 210, workload scheduling program 150 creates a graph, referred to as a task and data graph (e.g., task and data graph 300, see FIG. 3), which provides a representation of information related to computing job 120 received in step 205. In the depicted embodiment, workload scheduling program 150 creates a task and data graph for computing job 120 that includes a visual representation of prerequisite tasks and data dependencies for each task within computing job 120. In other embodiments, a non-visual representation such as a chart, table, or data structure containing equivalent information may be created in place of a task and data graph.

In some embodiments, information included in a task and data graph may be represented in a set of matrices. In one embodiment, a compute matrix, data matrix, and locality matrix are created to indicate whether a task can be executed by a given data processing element, if a data set is present on a given data storage element, and whether a data processing element has local access to a data storage element, respectively. In an example, a compute matrix "A" contains a value of 1 at the location $A_{CN}$ if task "C" can be executed on data processing element "N", and contains a value of 0 otherwise. Further, a data matrix "B" contains a value of 1 at the location $B_{DS}$ if a data storage element "S" contains data set "D", and contains a value of 0 otherwise. Additionally, a locality matrix "C" contains value of 1 at the location $C_{SN}$ if a data storage element "S" is local to data processing element "N", and contains a value of 0 otherwise. In other embodiments, additional matrices or other data structures may be utilized to represent the data otherwise included in a task and data graph. An example of a task and data graph will be discussed in further detail with regard to FIG. 3.

In step 215, workload scheduling program 150 creates a graph, hereinafter referred to as a resource graph, which identifies tasks within computing job 120 that can be executed on each of the specific data processing elements (e.g., CPUs, GPUs, FPGAs, etc.) contained within heterogeneous computing device 110. In some embodiments, information related to the data processing elements and data storage elements included in heterogeneous computing device 110 are input by a user, while in other embodiments this information may be collected automatically from heterogeneous computing device 110. In order to determine if a task can be executed by a data processing element, workload scheduling program 150 determines if the type of computation required for the task can be performed by a given data processing element. In various embodiments, FPGAs and GPUs may be configured to perform a specific subset of computing tasks such as graphical computation, video encoding, or data mining computation. In the depicted embodiment, FPGA 405 and GPU 403 are both configured to perform graphical computation. In general, the determination of whether or not a data processing element can perform a task is based in part on the current configuration of a data processing element to perform a specific subset of computing tasks, as well as a table which lists all the data processing elements available for use along with their capabilities for executing various types of tasks. In other embodiments, data included in computing job 120 may describe a specific type of data processing element which must perform a task within computing job 120. In this embodiment, CPU elements are assumed to be capable of executing any type of task, while FPGA and GPU elements are assumed to only be capable of executing a subset of computing tasks. In addition to compute elements, workload scheduling program 150 also includes information related to storage nodes present in heterogeneous computing device 110 in the generated resource graph. If one or more of the tasks in computing job 120 have data dependencies, workload scheduling program 150 indicates the location of required data on the resource graph generated. In the depicted embodiment (see FIG. 4), data set 311 is present on SSD 411 and HDD 412, while data set 312 is present on HDD 412 and SSD 413. In some embodiments, workload scheduling program 150 searches available data storage elements for required data sets. In other embodiments the location of required data sets is indicated in the data describing computing job 120 received in step 205. In the depicted embodiment, a data locality constraint is utilized to ensure that a task will only execute on nodes which have local access to data sets required as data dependencies for that task. For example, based on this data locality constraint, workload scheduling program 150 identifies that task 301 can only be executed on a data processing element which has local access to a data storage element containing data set 311, based on the fact that task 301 has data set 311 listed as a data dependency. While a data locality constraint is present in this embodiment, a data locality constraint may be either absent or present in another form, such as a different limit on the proximity of a data storage node containing a data set to a data processing node, in other embodiments.

In step 220, based on the resource graph generated in step 215, workload scheduling program 150 generates feasible execution mappings to identify possible schemes for executing computing job 120 on heterogeneous computing device 110. Using the information represented in the task and data graph, workload scheduling program 150 assigns the task, or set of tasks, which must be executed first to one or more data processing elements identified as capable of executing that task in the resource graph. In this embodiment, due to the fact that task 301 serves as a prerequisite task to tasks 302 and 303, and is an indirect prerequisite to task 304, workload scheduling program 150 identifies that task 301 must be assigned to a data processing element prior to tasks 302 and 303. Based on the information contained in the resource graph generated in step 215, workload scheduling program 150 identifies that task 301 can be executed by any of data processing elements 401, 402, or 403. In other embodiments, workload scheduling program 150 generates various numbers of mappings, and in some embodiments workload scheduling program 150 generates every mapping possible based on the resource graph to ensure that the best possible mapping can be chosen. In this embodiment, workload scheduling program 150 only creates two mappings in order to limit the amount of computational time required to select a mapping for execution. Once workload scheduling program 150 assigns a first task, workload scheduling program 150 assigns each of the subsequent tasks in the order that they must be executed based on the task and data graph generated in step 210. The process of assigning tasks to data processing elements to create feasible execution mappings is described in greater detail with respect to FIGS. 6A and 6B.

In step 225, workload scheduling program 150 evaluates feasible execution mappings generated in step 220. Execution mappings are evaluated in order to determine a total job execution time and/or cost associated with a mapping such as a cost charged by a cloud services provider for utilizing resources such as processing power, data storage, and data I/O. A total job execution time is determined based on the type of data processing element performing each task within computing job 120, in addition to the type of data storage element providing data to the data processing element executing a given task. Workload scheduling program 150 uses details regarding the type of data processing elements and their historic completion times for executing similar tasks to determine an expected completion time for a given task, and then combines this information with runtime data, such as overhead and utilization data, to compute an expected response time for each task. In some embodiments, where the scheduling of computing job execution is performed in advance of execution, runtime-specific data, such as current utilization, may not be available, and workload scheduling program 150 may incorporate an average measure for these factors instead. In some embodiments, workload scheduling program 150 creates and maintains a database which lists the historical processing rate and completion times for each of the various data processing elements to execute tasks. This database may also include data transfer rates and performance information associated with the data storage element present within heterogeneous computing device 110. In embodiments where no historical data is available, in order for workload scheduling program 150 to generate an estimate for the response time of a given task, an equation, such as the following is used:

$$R_{cn} = \frac{S_{cn}}{1-u_n} \quad (1)$$

In equation (1), the term R represents the response time expected for a given task "c" to be executed on a data processing element "n". The term $S_{cn}$ represents the ideal computation time for the execution of a task "c" on a data processing element "n" with no overhead or other utilization of the data processing element factored in. For example, for a task requiring three billion floating-point operations running on a CPU which can perform one billion floating point operations per second, the ideal computation time ($S_{cn}$) would be three seconds. For the same task requiring three billion floating-point operations, execution on an FPGA capable of performing ten billion floating-point operations per second would yield an ideal computation time ($S_{cn}$) of 0.3 seconds. Workload scheduling program 150 utilizes the ideal computation time to account for increases in performance that one data processing element provides compared to another type of data processing element. The term $1-u_n$ represents the portion of the data processing element's total power which is available to be used for the execution of task "n". The term $u_n$ represents the total utilization, as a value between zero and one, of the data processing element "n", including overhead and any other tasks which data processing element "n" is currently performing in addition to the execution of task "c". In some embodiments, the value of $u_n$ is defined by the following equation:

$$u_n = u_{0n} + \sum_c \lambda x_{cn} s_{cn} \quad (2)$$

In equation (2), the total utilization value for a data processing element "n" is defined as the sum of the utilization due to idle processes and system overhead and the utilization of that data processing element due to the execution of a task included in a job other than the job currently being scheduled by workload scheduling program 150. The term $u_{0n}$ represents the utilization of the data processing element due to overhead or any process unrelated to the execution of a task. The second term in equation (2) represents the utilization of a data processing element due to performing tasks included in a job other than the job being scheduled by workload scheduling program 150. The second term takes a summation over all tasks currently being performed by heterogeneous computing device 110 to determine the portion of the utilization factor due to the execution of one or more computing jobs other than computing job 120. In embodiments where computing job 120 is the only computing job being executed on heterogeneous computing device 110, the total utilization for a data processing element "n" will be equal to $u_{0n}$. In embodiments where there are computing jobs other than computing job 120 executing on heterogeneous computing device 110, λ represents the arrival rate of tasks to data processing element "n" for all tasks not included in computing job 120. The term $x_{cn}$ is an array of binary data containing a value of 1 at the location $x_{cn}$ if task "c" is executed on data processing element "n", and a 0 otherwise. The term $s_{cn}$ is the same value introduced in equation (1), representing the expected amount of time required to execute a task "c" on a data processing element "n".

In embodiments where data needed for the execution of a task is retrieved from a storage device, workload scheduling program 150 includes the expected total time spent waiting for data to be received from a storage device ($R_{io,c,n}$), in the determination of the expected total time to complete a task "c" using data processing element "n" ($R_{total,c,n}$). In general, $R_{total,c,n}$ is determined by adding the expected amount of time spent waiting for data to be received from a data storage element and the total amount of time required by the data processing element to execute the task, as represented by the following equation:

$$R_{total,c,n} = R_{cn} + R_{io,c,n} \quad (3)$$

In some embodiments, code utilized for the execution of a task or information which results from the execution of a prerequisite task must be transferred between data processing elements. In these embodiments, workload scheduling program 150 will include the total expected time needed to transfer this information when calculating $R_{total,c,n}$. Once workload scheduling program 150 computes an $R_{total,c,n}$ value for each task, workload scheduling program 150 determines the total job response time ($R_{total}$) based on the task and data graph generated for the job. In embodiments where two or more tasks can be executed simultaneously, such as task 302 and task 303 in the depicted embodiment (see FIG. 3), the response time for the step of executing multiple tasks simultaneously will be equal to the greatest of the response times determined for each individual task. In a feasible execution mapping, where tasks 302 and 303 are executed simultaneously before executing task 304, the total job response time for computing job 120 will be equal to:

$$R_{total} = R_{total,task301,n} + \max(R_{total,task302,n}, R_{total,task303,n}) + R_{total,task304,n} \quad (4)$$

Additionally, if tasks 302 and 303 were to be performed sequentially as opposed to simultaneously, the resulting total job response time would be equal to:

$$R_{total} = R_{total,task301,n} + R_{total,task302,n} + R_{total,task303,n} + R_{total,task304,n} \quad (5)$$

In other embodiments, workload scheduling program 150 uses an optimization model to identify the best execution mapping. In these embodiments, the optimization model seeks to minimize the total response time represented by an objective function such as the following:

$$\sum_{n \in L_{task301}} R_{total,task301,n} x_{task301,n} + \max\left(\sum_{n \in L_{task302}} R_{total,task302,n} x_{task302,n} + \sum_{n \in L_{task303}} R_{total,task303,n} x_{task303,n}\right) + \sum_{n \in L_{task304}} R_{total,task304,n} x_{task304,n} \quad (6)$$

In equation (6), the term $R_{cn}$ is the same as the $R_{cn}$ term defined in equation (1). In various embodiments, the term $x_{cn}$ is an array of binary values indicating whether or not a task "c" is executed on a data processing element "n" in a given mapping being evaluated. In these embodiments, there is only one value of "n" for which $x_{cn}$ has a value of 1, and for all other values of "n" $x_{cn}$ has a value of 0. Multiplying the terms $R_{cn}$ and $x_{cn}$ ensures that the execution of each task is only included once in the computation of the total response time for a computing job. In order to account for the data locality constraint present in the depicted embodiment, each summation is taken with the variable n varying over the array $L_c$ which represents the subset of all data processing elements which have local access to a data set required for the execution of task "c".

In embodiments where workload scheduling program 150 uses an optimization model to identify the best execution mapping, a totality constraint is used such as the following:

$$\sum_{n \in L_c} x_{cn} = 1 \quad (7)$$

The totality constraint represented by equation (7) indicates that a given task "c" is scheduled to be executed by exactly one data processing element "n" in any given mapping. The summation being taken over the interval $n \in L_c$ implies that the data processing element "n" executing task "c" must be within the set of data processing elements which have local access to a data set required for the execution of task "c" ($L_c$).

Figure 6A:
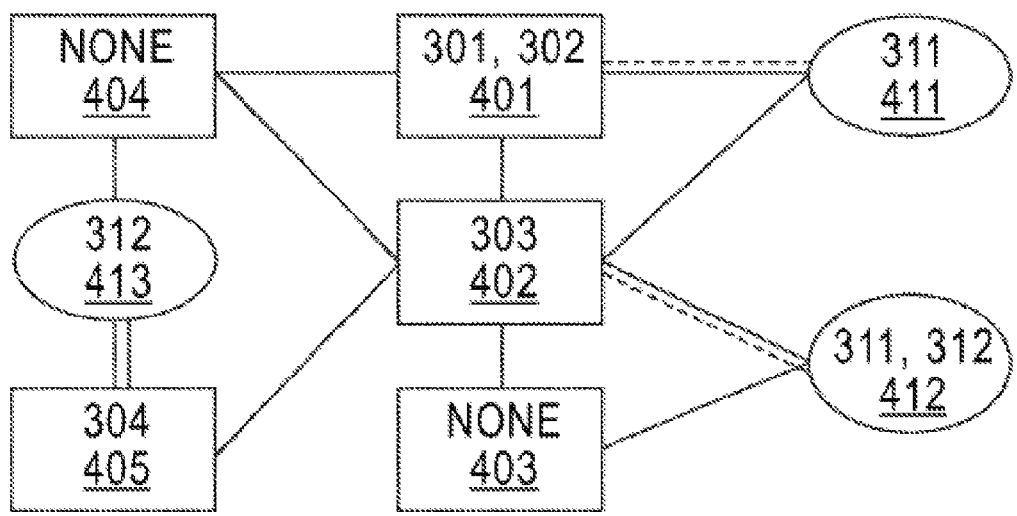
FIG. 6A-6B are each block diagrams representing two examples of feasible execution mappings for executing an example computing job on an example heterogeneous computing device, in accordance with an embodiment of the present invention.

In one embodiment, workload scheduling program 150 determines a cost associated with a mapping, based on a cost associated with an action, such as computation, network usage, idle time, data usage, and data I/O. In some embodiments, heterogeneous computing device 110 is a computer or cluster of computers located in a different location from computing device 140, and computing device 140 contains workload scheduling program 150, which performs the scheduling. In such embodiments, heterogeneous computing device 110 may be managed and operated by a third party, such as a "cloud" service provider. In these embodiments, charges are determined based on the utilization of elements such as computation, network usage, and data usage and I/O. Determining charges in these embodiments requires utilizing a policy or formula provided by a cloud service provider in order to determine a cost associated with each feasible execution mapping generated in step 220. In the depicted embodiment, the costs associated with the execution mapping depicted in FIG. 6A are determined by a set of formulas provided by a cloud services provider. The computing cost is determined based on the formula C where C(A,B) represents the cost associated with executing task A on data processing element B. Using this formula, the total computing cost associated with the mapping would be C(301,401)+C(302,401)+C(303,402)+C(304,405). The data access cost is determined by the formula D where D(A,B) represents the cost associated with reading a data set A stored on data storage element B. Using this formula, the total data access cost associated with the mapping would be D(311,411)+D(311,412)+D(312,412)+D(312,413). The network cost is determined by the formula N where N(A,B,C) represents the cost associated with moving data set A from data storage element B to data processing element C. Using this formula, the total network cost associated with the mapping would be N(311,411,401)+N(311,412,402)+N(312,412,402)+N(312,413,405).

In some embodiments, workload scheduling program 150 includes a cost associated with moving code used for the execution of one or more tasks. In these embodiments, the additional usage of resources such as the amount of computation, network usage, idle time, data usage, and data I/O needed to move the code required for executing one or more tasks are included when calculating the total cost associated with the mapping.

In some embodiments, output data generated by the execution of a task is stored in data storage elements and/or acts as an input to subsequent tasks. In these embodiments, workload scheduling program 150 includes a cost associated with moving output data generated by one or more tasks to data storage elements or as an input to a data processing element performing one or more subsequent tasks. In these embodiments, cost associated with additional usage of resources such as computation, network usage, idle time, data usage, and data I/O needed to move the output data are included when calculating the total cost associated with the mapping.

In step 230, workload scheduling program 150 examines the total job execution time and cost for each mapping and selects a mapping based on criteria specified by a user. In some embodiments, a user is prompted to input a specific metric to improve such as overall completion time or cost of executing the computing job. In other embodiments, relative weights for multiple criteria may be provided by a user as inputs to workload scheduling program 150. In embodiments where relative weights are provided for multiple criteria, workload scheduling program 150 selects a mapping based on the relative importance of a criteria indicated by its relative weight and the performance of a mapping with respect to that criteria. In an example, a user is only interested in minimizing the total cost of a mapping. As a result, workload scheduling program 150 selects a mapping which has been determined to have the lowest total cost for executing computing job 120. In other embodiments, such as embodiments where heterogeneous computing device 110 is a local computing device and there is not a significant operational cost for executing a job on this device, minimizing the total job execution time may be the only objective of workload scheduling program 150. In embodiments where both cost and total job execution time are of interest to a user, a user provides a relative weight for each factor of interest, such that the sum of all relative weights is equal to one, and workload scheduling program 150 utilizes these relative weights to gauge the overall rank of the mappings generated in step 220. For example, in some embodiments all mappings generated are ranked based on both the overall cost and total job execution time associated with the mapping. In some embodiments, a mapping has a separate ranking for each factor of interest on which it is evaluated, such as total cost and total job execution time in the depicted embodiment. In other embodiments, workload scheduling program 150 assigns a mapping a value for each factor of interest based on its relation to the performance of another mapping with respect to that factor of interest and the best performance achieved by any mapping with respect to that factor of interest. In an embodiment where relative weights for cost and total job execution time associated with a mapping are 0.7 and 0.3 respectively, workload scheduling program 150 multiples the value for each factor of interest by the relative weight for that factor of interest to get a scaled value. Once workload scheduling program 150 generates all scaled values, the scaled values are added together to get a total value for that mapping. Workload scheduling program 150 selects the mapping which receives the highest total value for execution on heterogeneous computing device 110.

Figure 3:
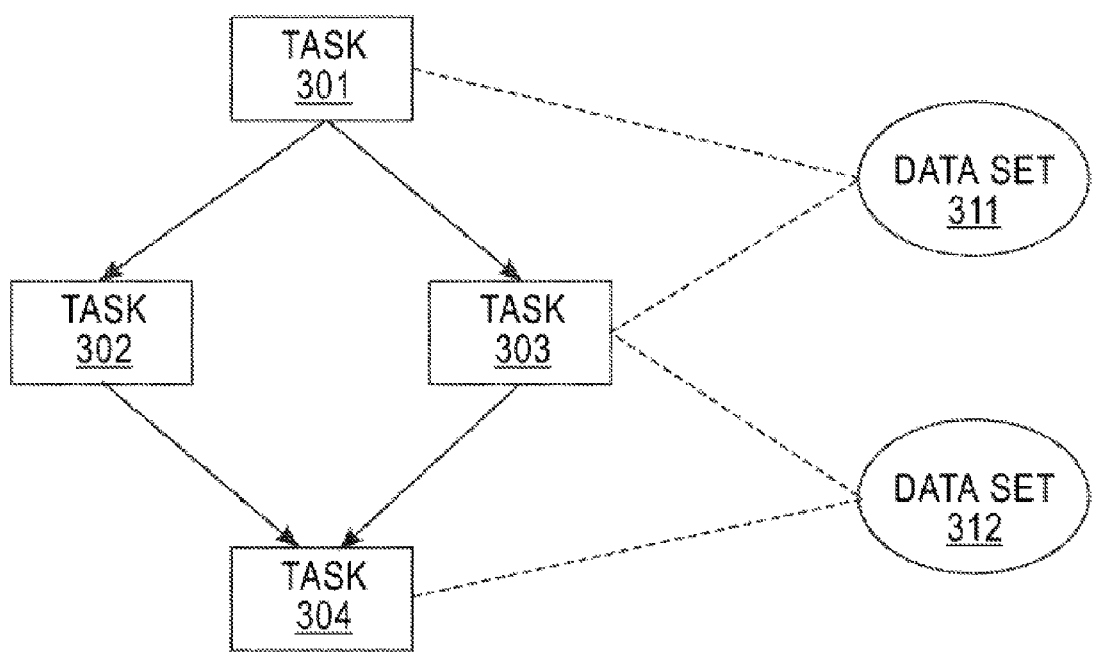
FIG. 3 is a block diagram representing a task and data graph for an example of a computing job to be executed by the heterogeneous computing device within the computing environment of FIG. 1, in accordance with an embodiment of the present invention.

FIG. 3 depicts an example task and data graph, generally designated 300, in accordance with one embodiment of the present invention. In general, task and data graph 300 is intended to illustrate the tasks included in computing job 120 as well as prerequisite tasks and data dependencies associated with each task, in accordance with one embodiment of the present invention. As depicted, tasks are shown by rectangular boxes connected with arrows to indicate prerequisite tasks. For example, if an arrow connects from task A to task B, then task A serves as a prerequisite task for task B. In general, the prerequisite relationship indicates that task A must be executed completely before execution of task B can begin. However, in some embodiments, the prerequisite relationship indicates that task A must be at least partially executed before execution of task B can begin. In the depicted example, data sets are indicated within a task and data graph by oval shaped elements connected to tasks by dashed lines. A dashed line between task A and data set C indicates that task A has a data dependency of task C. In general, a data dependency indicates that execution of task A cannot proceed unless the data processing element executing task A has access to a data storage element containing data set C.

In the depicted embodiment, computing job 120 includes tasks 301, 302, 303, and 304. Task 301 contains no prerequisite tasks and as a result is depicted at the top of the task and data graph. In this embodiment, execution of the tasks begins at the top of the task and data graph and continues downward executing each task as soon as all of its prerequisite tasks have been executed. In other embodiments, tasks are depicted as executing from top to bottom, left to right, right to left, bottom to top, or in any other direction. Some embodiments do not include a graphical representation of a task and data graph, but rather just an order that tasks within computing job 120 must execute in, including each tasks prerequisite tasks and data dependencies.

Below task 301, task 302 and 303 are shown side by side, both with the prerequisite task of task 301. Having no prerequisite connection between tasks 302 and 303 indicates that both tasks can execute simultaneously once task 301 completes execution. Below tasks 302 and 303 is task 304, which has prerequisite tasks of both task 302 and 303. Because both tasks are required to be completed before execution of task 304 can begin, task 304 begins after whichever of tasks 302 and 303 completes execution last.

Task 301 has a data dependency of data set 311, as indicated by the dashed line connecting task 301 and data set 311. As task 302 has no dashed line connections to any data sets, task 302 has no data dependencies and does not require any data sets to be available in order for it to execute. Task 303 has a data dependency of both data set 311 and 312, while task 304 only has a data dependency of data set 312.

Figure 4:
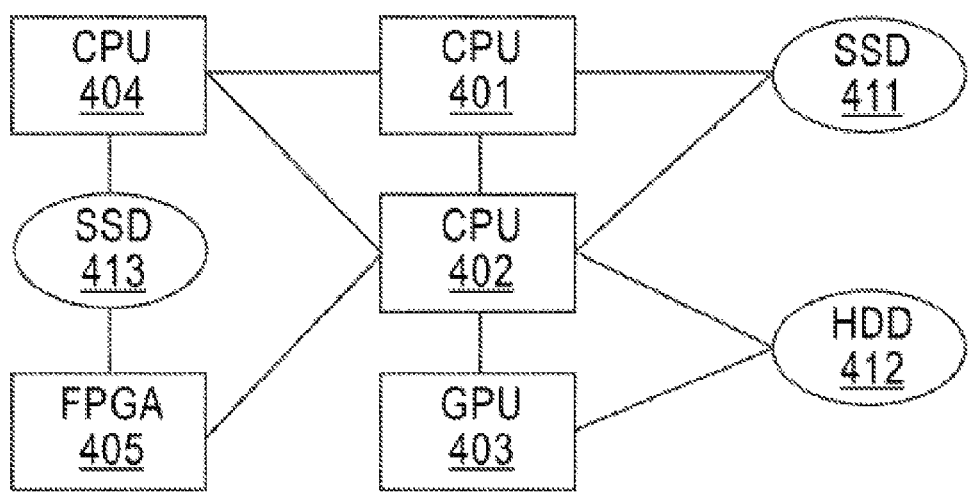
FIG. 4 is a block diagram of components of an example of a heterogeneous computing device executing a computing job within the computing environment of FIG. 1, in accordance with an embodiment of the present invention.

FIG. 4 is a block diagram illustrating the data processing and data storage elements of the depicted embodiment of heterogeneous computing device 110, generally designated 400, in accordance with an embodiment of the present invention. In general, block diagram 400 is intended to illustrate the various data processing and data storage elements present within heterogeneous computing device 110, in accordance with one embodiment of the present invention. Other embodiments may include any number of data processing or data storage elements, additional data processing elements not included in the depicted embodiment such as application specific integrated circuits (ASICs) or data storage elements such as optical storage disks such as compact disks (CDs). Additionally, other embodiments may include any number of different layouts or different system topologies of heterogeneous computing device 110.

In the depicted embodiment, heterogeneous computing device 110 includes CPUs 401, 402, and 404, GPU 403, FPGA 405, HDD 412, and SSDs 411 and 413. In this embodiment, CPUs 401, 402, and 404 are capable of executing any of the tasks contained within computing job 120, while in other embodiments various different types of CPUs may be present within heterogeneous computing device 110 which each have different execution capabilities and performance statistics. In the depicted embodiment, GPU 403 and FPGA 405 are considered to only be suitable to perform tasks 301 and 304. In general, GPU 403 and FPGA 405 are data processing elements designed to handle a specific subset of computing tasks and may not be suitable to perform every task included in a computing job such as computing job 120. For example, in some embodiments FPGA 405 may be configured to perform a specific type of computation such as transcoding video and may not be appropriate to utilize for a different form of computation such as a data mining task without being reconfigured. In this embodiment, data storage elements SSD 411 and 413 and HDD 412 are included in heterogeneous computing device 110. In some embodiments, specific types of data storage elements such as a hard disk drive (HDD), solid state drive (SSD), or flash memory can be considered unsuitable for storing a given type of data, or a given portion of data comprising a data dependency for a task within computing job 120. However, in this embodiment all data storage elements included in heterogeneous computing device 110 are considered to be suitable for storing any type of data. Lines connecting various data processing elements or data storage elements together represent network links between different elements in heterogeneous computing device 110. Network links represent direct paths that can support the transfer of information without having to pass through another component of the system. Any component connected directly to a given component via a network link is considered to be a "local" component. For example, in the depicted embodiment SSD 411 is connected to CPU 401 via a network link, and as a result SSD 411 is considered a local component to CPU 401. In contrast, SSD 411 has no direct network link to FPGA 405, and as a result SSD 411 is not considered to be a local component to FPGA 405. In terms of the data locality constraint implemented in the depicted embodiment, if a data set "A" which is present on SSD 411 is required for the execution of a task "B", then task "B" can be executed on CPU 401 or 402 and cannot be executed on FPGA 405 under the data locality constraint.

Figure 5:
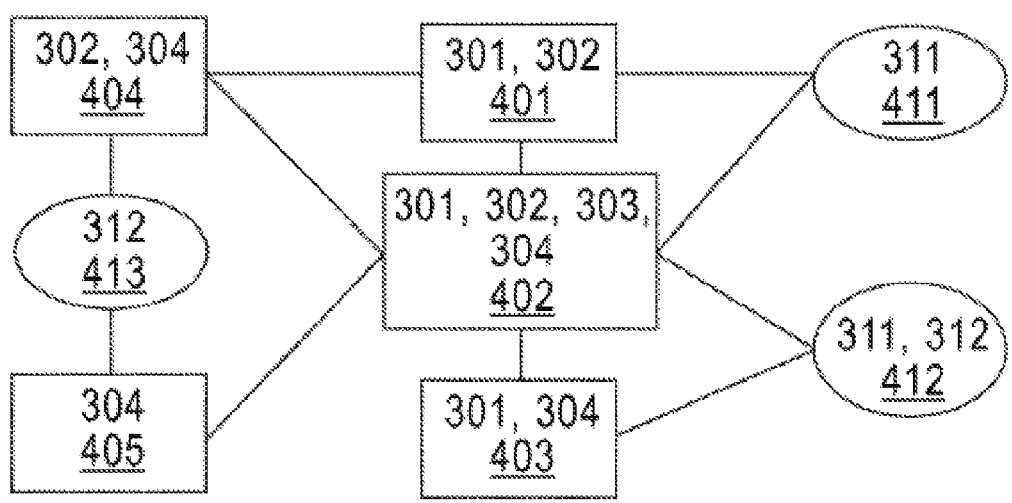
FIG. 5 is a block diagram representing an example of a resource graph indicating tasks within a computing job that can be performed by each component within the example heterogeneous computing device of FIG. 4, in accordance with an embodiment of the present invention.

FIG. 5 depicts an example resource graph, generally designated 500, in accordance with an embodiment of the present invention. In general, resource graph 500 is intended to illustrate which tasks included in computing job 120 (see FIG. 3) can be executed by each data processing element of heterogeneous computing device 110 based on the computing capabilities of that data processing element and the data locality constraint present in the depicted embodiment. If a task can be executed by a given data processing element, then that task will be listed within the corresponding data processing element in FIG. 5. Additionally, data storage elements are labeled with one or more data sets which are stored on that data storage element. For example, in this embodiment CPU 404 is assumed to be capable of executing any of the tasks included in computing job 120, but CPU 404 only has local access to data set 312 which is stored on SSD 413. Under the data locality constraint, because CPU 404 does not have local access to a data storage element containing data set 311, tasks 301 and 303 cannot be executed by CPU 404 because data set 311 which serves as a data dependency for tasks 301 and 303 is not available locally.

FIG. 6A depicts a first feasible execution mapping for executing computing job 120 on heterogeneous computing device 110, generally designated 600, in accordance with an embodiment of the present invention. Tasks listed inside of data processing elements represent tasks performed by those data processing elements, while data sets listed inside data storage elements represent data sets provided to data processing elements by those data storage elements. Dashed lines connecting data processing elements and data storage elements indicate the transfer of one or more data sets from a data storage element to a data processing element for use executing a task. For example, in this feasible execution mapping CPU 402 executes task 303. Task 303 has a data dependency of data set 311 which is stored locally on SSD 411. In this feasible execution mapping, the dashed line connecting SSD 411 and CPU 402 represents the transfer of data set 311 from SSD 411 to CPU 402. In some embodiments, a data processing element receives data sets from multiple data storage elements, and in these embodiments multiple dashed line connections are present between the data processing element executing a task and the various data storage elements providing data sets. In this feasible execution mapping, task 301 is executed by CPU 401. After task 301 is executed, tasks 302 and 303 may be executed simultaneously by CPUs 401 and 402. Once both task 302 and 303 have completed, task 304 is executed by FPGA 405.

Figure 6B:
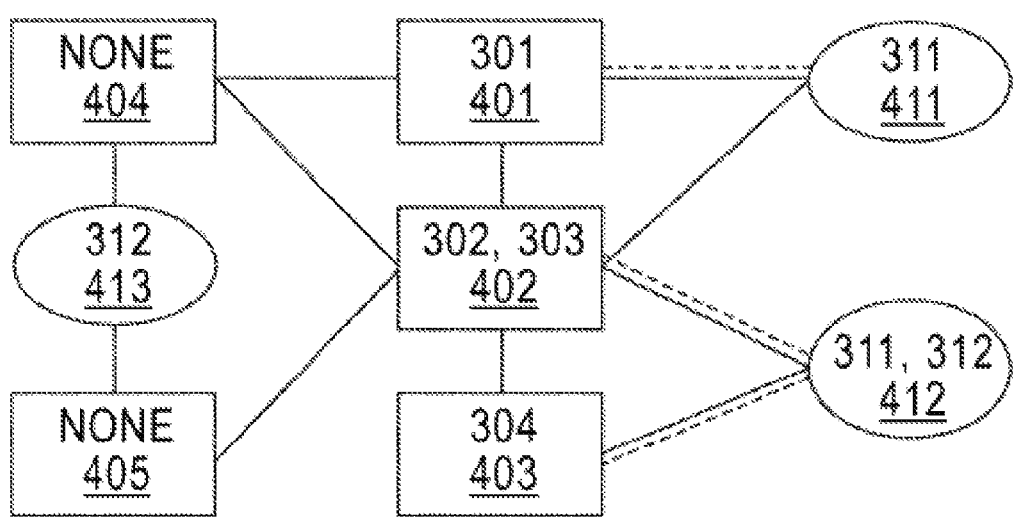

FIG. 6B depicts a second feasible execution mapping for executing job 120 on heterogeneous computing device 110, generally designated 605, in accordance with an embodiment of the present invention. In this feasible execution mapping, task 301 is executed by CPU 401. Once task 301 is executed, tasks 302 and 303 are both executed by CPU 402. In the depicted embodiment, tasks 302 and 303 must be performed sequentially as a result of both being executed by CPU 402. In other embodiments data processing elements such as CPU 402 may include processor sharing mechanisms which allow for more than one task to be executed by a data processing element concurrently. In the depicted embodiment, executing both tasks 302 and 303 on CPU 402 implies that tasks 302 and 303 will not execute simultaneously, and thus changes the overall expected job execution time for this feasible execution mapping. Because tasks 302 and 303 must be executed sequentially by CPU 402 instead of being executed concurrently by CPU 401 and CPU 402, the overall expected job execution time for this job may be longer than the overall expected job execution time for feasible execution mapping 600. Once both task 302 and task 303 have been executed, task 304 is executed by GPU 403.

Figure 7:
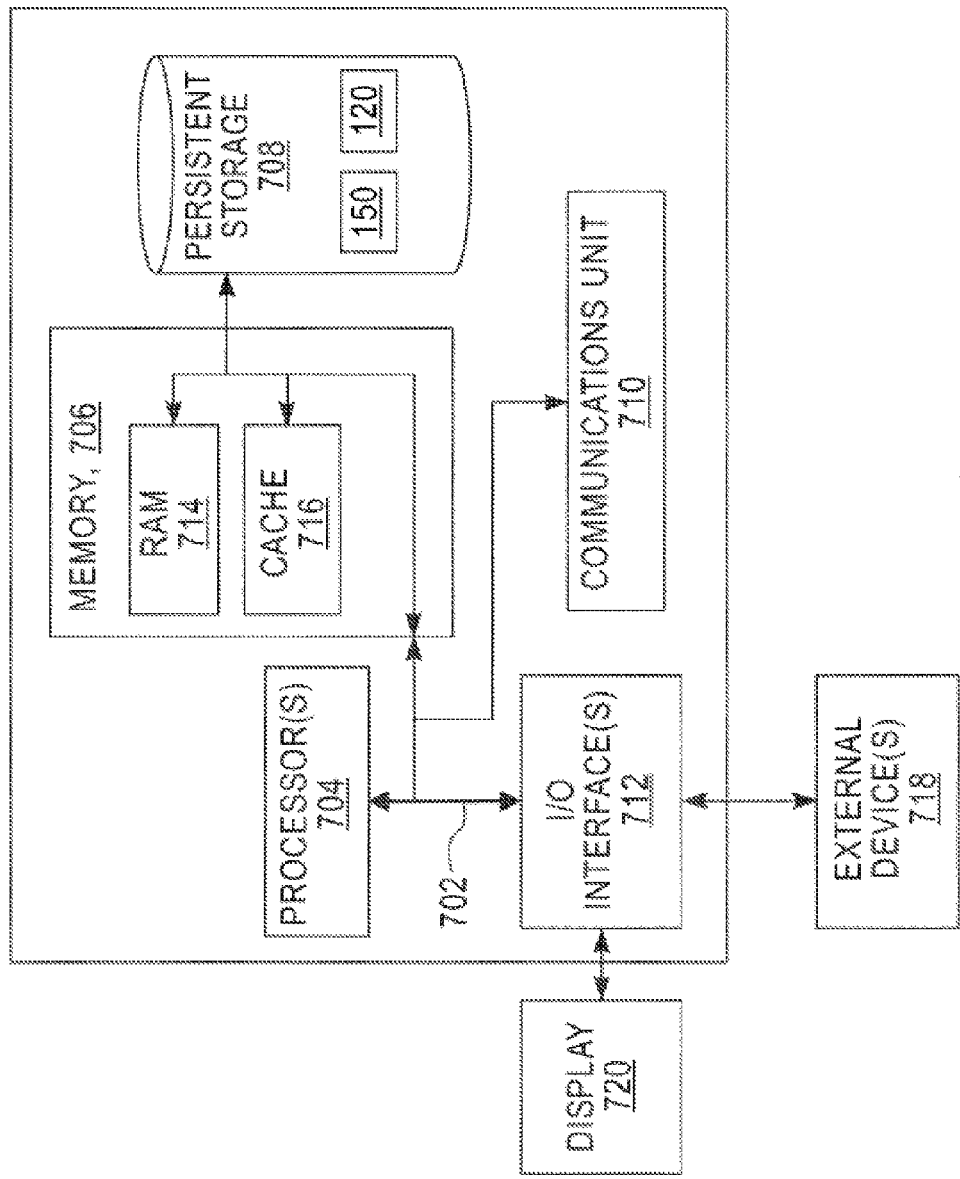
FIG. 7 is a block diagram of components of the computing devices within the computing environment of FIG. 1, in accordance with an embodiment of the present invention.

FIG. 7 depicts a block diagram of components of computing device 104 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 140 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Workload scheduling program 150 is stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of enterprise grid 712 and client devices 704, 706, and 708. In these examples, communications unit 710 includes one or more network interface cards. Communications unit 710 may provide communications through the use of either or both physical and wireless communications links. Workload scheduling program 150 may be downloaded to persistent storage 708 through communications unit 710.

I/O interface(s) 712 allows for input and output of data with other devices that may be connected to server computer 702. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., workload scheduling program 150, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for scheduling and executing a computing job in a computing environment, the method comprising:
   receiving, by a computer, a request for scheduling execution of a computing job, wherein the computing job includes a plurality of computing tasks to be executed in a sequence, and wherein at least one computing task requires access to a set of data;
   identifying, by the computer, information related to the computing environment, wherein the information comprises at least:
      processors available to execute each computing task of the plurality of computing tasks;
      storage device proximity to the processors; and
      a monetary cost associated with utilizing components of the computing environment;
   generating, by the computer, one or more execution mappings for the computing job based, at least in part, on the received request, the information related to the computing environment, and current utilization of the processors' resources;
   selecting, by the computer, an execution mapping from the one or more execution mappings based, at least in part, on an expected amount of time to execute the computing job and an expected cost associated with executing the computing job; and
   executing, by the computer, the computing job according to the selected execution mapping.

2. The method of claim 1, wherein the processors comprise a plurality of types of processors; and
   wherein determining an execution mapping for the computing job is further based on capabilities of the plurality of types of processors to execute each task.

3. The method of claim 1, wherein the execution mapping for the computing job comprises an assignment of each computing task of the plurality of computing tasks to a processor of the processors and a selection of a storage device to provide the set of data required by the at least one computing task.

4. The method of claim 1, wherein each processor of the processors resources is selected from the group consisting of a central processing unit (CPU), a field programmable gate array (FPGA), a graphics processing unit (GPU), and an application-specific integrated circuit (ASIC).

5. The method of claim 1, wherein the selection of an execution mapping comprises solving an optimization problem, wherein the optimization problem comprises performance and cost evaluation for an execution mapping.

6. A computer program product for scheduling and executing a computing job in a computing environment, the computer program product comprising:
   one or more computer readable storage media and program instructions stored on the one or more computer readable storage media, the program instructions comprising:
   program instructions to receive a request for scheduling execution of a computing job, wherein the computing job includes a plurality of computing tasks to be executed in a sequence, and wherein at least one computing task requires access to a set of data;
   program instructions to identify information related to the computing environment, wherein the information comprises at least:
      processors available to execute each computing task of the plurality of computing tasks;
      storage device proximity to the processors; and
      a monetary cost associated with utilizing components of the computing environment;
   program instructions to generate one or more execution mappings for the computing job based, at least in part, on the received request, the information related to the computing environment, and current utilization of the processors' resources;
   program instructions to select an execution mapping from one or more execution mappings based, at least in part, on an expected amount of time to execute the computing job and an expected cost associated with executing the computing job; and
   program instructions to execute the computing job according to the selected execution mapping.

7. The computer program product of claim 6, wherein the processors comprise a plurality of types of processors; and
   wherein program instructions to determine an execution mapping for the computing job are further based on capabilities of the plurality of types of processors to execute each task.

8. The computer program product of claim 6, wherein the execution mapping for the computing job comprises an assignment of each computing task of the plurality of computing tasks to a processor of the processors and a selection of a storage device to provide the set of data required by the at least one computing task.

9. The computer program product of claim 6, wherein each processor of the processors resources is selected from the group consisting of a central processing unit (CPU), a field programmable gate array (FPGA), a graphics processing unit (GPU), and an application-specific integrated circuit (ASIC).

10. The computer program product of claim 6, wherein program instructions to select an execution mapping comprise program instructions to solve an optimization problem, wherein the optimization problem comprises performance and cost evaluation for an execution mapping.

11. A computer system for scheduling and executing a computing job in a computing environment, the computer system comprising:
   one or more computer processors, one or more computer readable storage media, and program instructions stored on the computer readable storage media for execution by at least one of the one or more processors, the program instructions comprising:
   program instructions to receive a request for scheduling execution of a computing job, wherein the computing job includes a plurality of computing tasks to be executed in a sequence, and wherein at least one computing task requires access to a set of data;
   program instructions to identify information related to the computing environment, wherein the information comprises at least:
      processors available to execute each computing task of the plurality of computing tasks;
      storage device proximity to the processors; and
      a monetary cost associated with utilizing components of the computing environment;
   program instructions to generate one or more execution mappings for the computing job based, at least in part, on the received request, the information related to the computing environment, and current utilization of the processors' resources;

program instructions to select an execution mapping from one or more execution mappings based, at least in part, on an expected amount of time to execute the computing job and an expected cost associated with executing the computing job; and program instructions to execute the computing job according to the selected execution mapping.

12. The computer system of claim 11, wherein the processors comprise a plurality of types of processors; and wherein program instructions to determine an execution mapping for the computing job are further based on capabilities of the plurality of types of processors to execute each task.

\* \* \* \* \*